United States Patent
Corbett et al.

(10) Patent No.: US 9,581,695 B2
(45) Date of Patent: Feb. 28, 2017

(54) GENERATING A MAP USING RADAR DATA

(71) Applicant: Navico Holding AS, Egersund (NO)

(72) Inventors: Andrew Corbett, Auckland (NZ);
Shane Coloney, Jenks, OK (US);
Lindsay Lilburn, Auckland (NZ)

(73) Assignee: Navico Holding AS, Egersund (NO)

( * ) Notice: Subject to any disclaimer, the term of this patent is extended or adjusted under 35 U.S.C. 154(b) by 232 days.

(21) Appl. No.: 14/310,053

(22) Filed: Jun. 20, 2014

(65) Prior Publication Data

US 2015/0369914 A1    Dec. 24, 2015

(51) Int. Cl.

| G01S 15/89 | (2006.01) |
| G01S 13/93 | (2006.01) |
| G01S 7/00 | (2006.01) |
| G01S 13/89 | (2006.01) |
| G01S 13/86 | (2006.01) |
| G01S 7/62 | (2006.01) |
| G06T 11/20 | (2006.01) |

(52) U.S. Cl.
CPC .............. *G01S 15/89* (2013.01); *G01S 7/003* (2013.01); *G01S 7/6218* (2013.01); *G01S 13/86* (2013.01); *G01S 13/862* (2013.01); *G01S 13/89* (2013.01); *G01S 13/9307* (2013.01); *G06T 11/206* (2013.01)

(58) Field of Classification Search
CPC ................................ G01S 13/89; G06T 11/206
See application file for complete search history.

(56) References Cited

U.S. PATENT DOCUMENTS

| 2014/0032479 A1* | 1/2014 | Lauenstein | ....... G06F 17/30241 |
| | | | 707/602 |
| 2014/0071167 A1* | 3/2014 | Lauenstein | ............. G06T 17/05 |
| | | | 345/634 |

FOREIGN PATENT DOCUMENTS

CN         103135101 A    *    6/2013

OTHER PUBLICATIONS

Lowrance product webpage discussing Insight Genesis, Mar. 15, 2013, Internet Archive Wayback Machine, downloaded on Mar. 31, 2016 from https://web.archive.org/web/20130315140903/http://www.lowrance.com/en-US/Products/Mapping/!.*
Contour Innovations about webpage, Feb. 27, 2013, Internet Archive Wayback Machine, downloaded on Mar. 31, 2016 from https://web.archive.org/web/20130227034217/http://contourinnovations.com/about.html.*

\* cited by examiner

*Primary Examiner* — Jeffery A Brier
(74) *Attorney, Agent, or Firm* — Nelson Mullins Riley & Scarborough LLP

(57) ABSTRACT

Various implementations described herein are directed to generating a map using radar data. In one implementation, a non-transitory computer-readable medium may have stored thereon a plurality of computer-executable instructions which, when executed by a computer, cause the computer to receive radar data for a marine environment proximate to a vessel, where the radar data are received from a radar sensor disposed on or proximate to the vessel. The computer-executable instructions may further be configured to cause the computer to generate a map of one or more substantially stationary objects in the marine environment based on the radar data.

19 Claims, 5 Drawing Sheets

GENERATING A MAP USING RADAR DATA

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Various forms of marine electronics data may be received, processed, and/or displayed using a computing device disposed aboard a vessel. Marine electronics data displayed using the computing device may assist an operator of the vessel with navigation and/or other functions. The marine electronics data may include, for example, sonar data, chart data, radar data, and/or navigation data.

In one scenario, chart data for a marine environment surrounding the vessel may be unavailable to the operator, such as for marine environments which have yet to be charted. In another scenario, chart data received by the computing device may not be up-to-date. In such scenarios, the computing device may not be able to display accurate chart data to assist the operator with navigation of the vessel in the marine environment.

SUMMARY

Described herein are implementations of various technologies relating to generating a map using radar data. In one implementation, a non-transitory computer-readable medium may have stored thereon a plurality of computer-executable instructions which, when executed by a computer, cause the computer to receive radar data for a marine environment proximate to a vessel, where the radar data are received from a radar sensor disposed on or proximate to the vessel. The computer-executable instructions may further be configured to cause the computer to generate a map of one or more substantially stationary objects in the marine environment based on the radar data.

In another implementation, a non-transitory computer-readable medium may have stored thereon a plurality of computer-executable instructions which, when executed by a computer, cause the computer to record radar data for a marine environment proximate to a vessel. The computer-executable instructions may further be configured to cause the computer to transmit the radar data to a server computer. The computer-executable instructions may additionally be configured to cause the computer to receive a map of one or more substantially stationary objects in the marine environment from the server computer, where the map is based on the radar data.

In yet another implementation, a method for generating a map using radar data may include receiving radar data for a marine environment proximate to a vessel, where the radar data are received from a radar sensor disposed on or proximate to the vessel. The method may also include generating a map of one or more substantially stationary objects in the marine environment based on the radar data.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
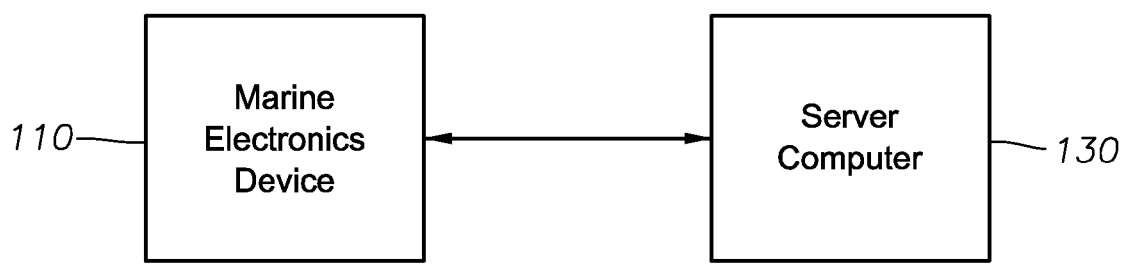
FIG. 1 illustrates a diagram of a marine computing system in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

Various implementations relating to generating a map using radar data, described herein, will now be described in more detail with reference to FIGS. 1-5.

Marine Computing System

A vessel traversing through water may use equipment to assist an operator of the vessel with various activities, such as fishing, vessel navigation, and the like. The vessel may be a surface water vehicle, a submersible water vehicle, or any other implementation known to those skilled in the art.

The equipment may include one or more marine electronics devices disposed on board and/or proximate to the vessel. The marine electronics device may be any computing implementation known to those skilled in the art, and is further described below with respect to FIG. 2. The marine electronics device may be used to process and/or display one or more types of marine electronics data, such as chart data, sonar data, structure data, radar data, navigation data, or any other type known to those skilled in the art.

In one implementation, the one or more marine electronics devices may be part of a marine computing system. FIG. 1 illustrates a diagram of a marine computing system 100 in accordance with implementations of various techniques described herein. The marine computing system 100 may include the marine electronics device 110 and a server computer 130. As further described below, the marine electronics device 110 may receive marine electronics data from components disposed on the vessel, and then transmit the marine electronics data to the server computer 130. In turn, the server computer 130 may process the marine electronics data, and then transmit the processed data to the marine electronics device 110.

Marine Electronics Device

The marine electronics device 110 may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
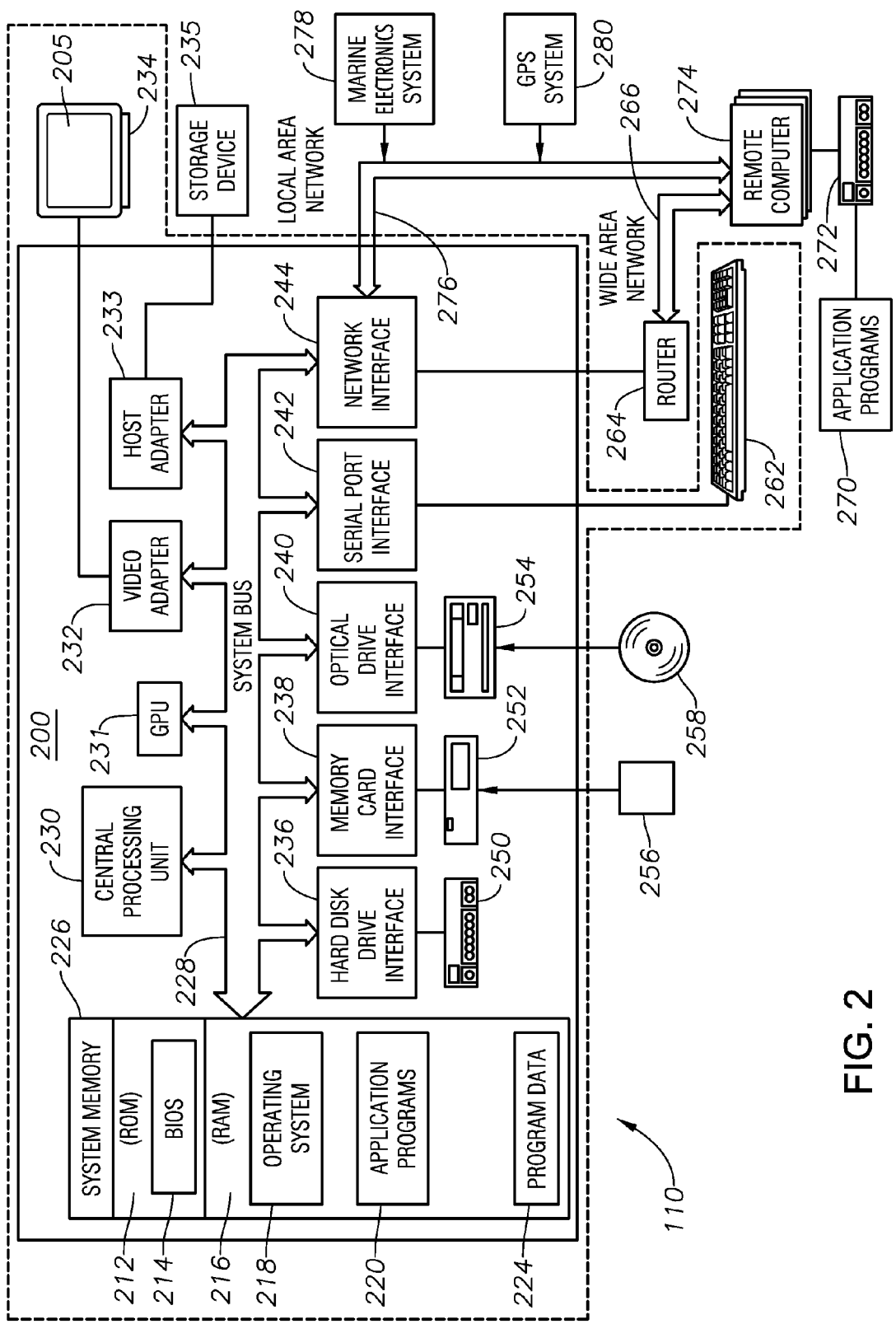
FIG. 2 illustrates a schematic diagram of a marine electronics device having a computing system in accordance with implementations of various techniques described herein.

FIG. 2 illustrates a schematic diagram of a marine electronics device 110 having a computing system 200 in accordance with implementations of various techniques described herein. The marine electronics device 110 may be any type of electrical and/or electronics device capable of processing data via the computing system 200. In one implementation, the marine electronics device 110 may be a marine instrument, such that the marine electronics device 110 may use the computing system 200 to display and/or process the one or more types of marine electronics data.

The computing system 200 may include a central processing unit (CPU) 230, a system memory 226, a graphics processing unit (GPU) 231 and a system bus 228 that couples various system components including the system memory 226 to the CPU 230. Although only one CPU 230 is illustrated in FIG. 2, it should be understood that in some implementations the computing system 200 may include more than one CPU 230.

The CPU 230 may include a microprocessor, a microcontroller, a processor, a programmable integrated circuit, or a combination thereof. The CPU 230 can comprise an off-the-shelf processor such as a Reduced Instruction Set Computer (RISC), or a Microprocessor without Interlocked Pipeline Stages (MIPS) processor, or a combination thereof. The CPU 230 may also include a proprietary processor.

The GPU 231 may be a microprocessor specifically designed to manipulate and implement computer graphics. The CPU 230 may offload work to the GPU 231. The GPU 231 may have its own graphics memory, and/or may have access to a portion of the system memory 226. As with the CPU 230, the GPU 231 may include one or more processing units, and each processing unit may include one or more cores.

The CPU 230 may provide output data to a GPU 231. The GPU 231 may generate graphical user interfaces that present the output data. The GPU 231 may also provide objects, such as menus, in the graphical user interface. A user may provide inputs by interacting with the objects. The GPU 231 may receive the inputs from interaction with the objects and provide the inputs to the CPU 230. A video adapter 232 may be provided to convert graphical data into signals for a monitor 234. The monitor 234 includes a screen 205. In certain implementations, the screen 205 may be sensitive to touching by a finger. In other implementations, the screen 205 may be sensitive to the body heat from the finger, a stylus, or responsive to a mouse.

The system bus 228 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 226 may include a read only memory (ROM) 212 and a random access memory (RAM) 216. A basic input/output system (BIOS) 214, containing the basic routines that help transfer information between elements within the computing system 200, such as during start-up, may be stored in the ROM 212.

The computing system 200 may further include a hard disk drive interface 236 for reading from and writing to a hard disk 250, a memory card reader 252 for reading from and writing to a removable memory card 256, and an optical disk drive 254 for reading from and writing to a removable optical disk 258, such as a CD ROM or other optical media. The hard disk 250, the memory card reader 252, and the optical disk drive 254 may be connected to the system bus 228 by a hard disk drive interface 236, a memory card reader interface 238, and an optical drive interface 240, respectively. The drives and their associated computer-readable media may provide nonvolatile storage of computer-readable instructions, data structures, program modules and other data for the computing system 200.

Although the computing system 200 is described herein as having a hard disk, a removable memory card 256 and a removable optical disk 258, it should be appreciated by those skilled in the art that the computing system 200 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 200. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 200 may also include a host adapter 233 that connects to a storage device 235 via a small computer system interface (SCSI) bus, a Fiber Channel bus, an eSATA bus, or using any other applicable computer bus interface.

The computing system 200 can also be connected to a router 264 to establish a wide area network (WAN) 266 with one or more remote computers 274. The router 264 may be connected to the system bus 228 via a network interface 244. The remote computers 274 can also include hard disks 272 that store application programs 270.

In another implementation, the computing system 200 may also connect to the remote computers 274 via local area network (LAN) 276 or the WAN 266. When using a LAN networking environment, the computing system 200 may be connected to the LAN 276 through the network interface or adapter 244. The LAN 276 may be implemented via a wired connection or a wireless connection. The LAN 276 may be implemented using Wi-Fi™ technology, cellular technology, Bluetooth™ technology, satellite technology, or any other implementation known to those skilled in the art. The network interface 244 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 274. It will be appreciated that the network connections shown are exemplary and other means of establishing a communications link between the computer systems may be used.

A number of program modules may be stored on the hard disk 250, memory card 256, optical disk 258, ROM 212 or RAM 216, including an operating system 218, one or more application programs 220, and program data 224. In certain implementations, the hard disk 250 may store a database system. The database system could include, for example, recorded points. The application programs 220 may include various mobile applications ("apps") and other applications configured to perform various methods and techniques described herein. The operating system 218 may be any suitable operating system that may control the operation of a networked personal or server computer.

A user may enter commands and information into the computing system 200 through input devices such as buttons 262, which may be physical buttons, virtual buttons, or combinations thereof. Other input devices may include a microphone, a mouse, or the like (not shown). These and other input devices may be connected to the CPU 230 through a serial port interface 242 coupled to system bus 228, but may be connected by other interfaces, such as a parallel port, game port or a universal serial bus (USB).

Certain implementations may be configured to be connected to a global positioning system (GPS) receiver system 280 and/or a marine electronics system 278. The GPS system 280 and/or marine electronics system 278 may be connected via the network interface 244.

The GPS receiver system 280 may be used to determine position data for the vessel on which the marine electronics device 110 is disposed. The GPS receiver system 280 may then transmit the position data to the marine electronics device 110. In other implementations, any positioning system known to those skilled in the art may be used to determine and/or provide the position data for the marine electronics device 110.

The marine electronics system 278 may include one or more components disposed at various locations on and/or proximate to the vessel. Such components may include one or more data modules, sensors, instrumentation, and/or any other devices known to those skilled in the art that may transmit various types of data to the marine electronics device 110 for processing and/or display. The various types of data transmitted to the marine electronics device 110 from the marine electronics system 278 may include marine electronics data and/or other data types known to those skilled in the art. The marine electronics data received from the marine electronics system 278 may include chart data, sonar data, structure data, radar data, navigation data, position data, heading data, automatic identification system (AIS) data, speed data, course data, or any other type known to those skilled in the art. In some implementations, the radar data may include Doppler data.

In one implementation, the marine electronics system 278 may include a radar sensor for recording the radar data, a compass heading sensor for recording the heading data, and a position sensor for recording the position data. In a further implementation, the marine electronics system 278 may include a sonar transducer for recording the sonar data, an AIS transponder for recording the AIS data, a paddlewheel sensor for recording the speed data, and/or the like.

The marine electronics device 110 may receive external data via the LAN 276 or the WAN 266. In one implementation, the external data may relate to information not available from the marine electronics system 278. The external data may be retrieved from the Internet or any other source. The external data may include atmospheric temperature, tidal data, weather, moon phase, sunrise, sunset, water levels, historic fishing data, and other fishing data.

Figure 3:
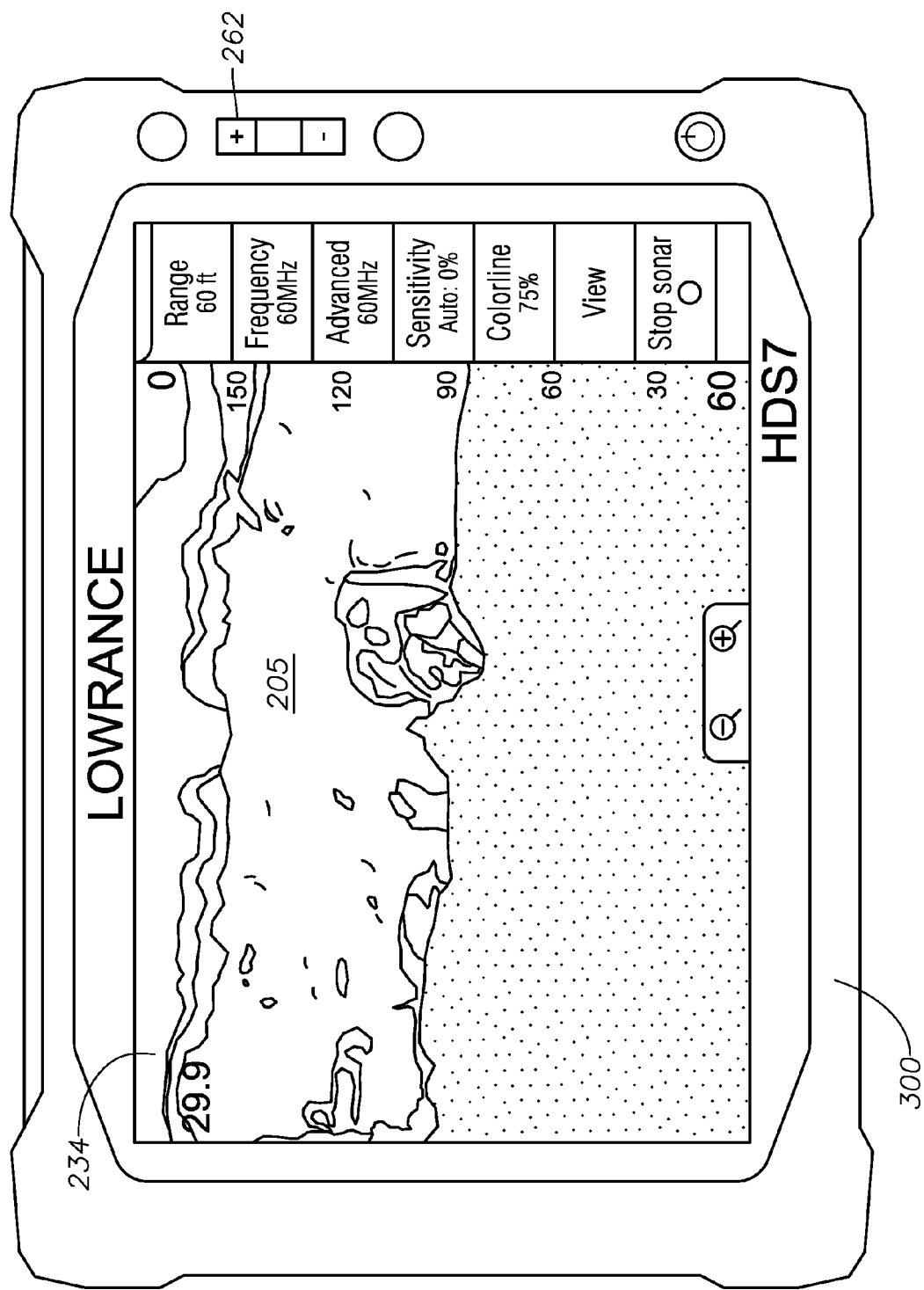
FIG. 3 illustrates a schematic diagram of a multi-function display (MFD) unit in accordance with implementations of various techniques described herein.

In one implementation, the marine electronics device 110 may be a multi-function display (MFD) unit, such that the marine electronics device 110 may be capable of displaying and/or processing multiple types of marine electronics data. FIG. 3 illustrates a schematic diagram of an MFD unit 300 in accordance with implementations of various techniques described herein. In particular, the MFD unit 300 may include the computing system 200, the monitor 234, the screen 205, and the buttons 262 such that they may be integrated into a single console.

Server Computer

As shown in FIG. 1, the marine electronics device 110 may transmit data to the server computer 130. In particular, the marine electronics device 110 may transmit the marine electronics data, the external data, and/or the like to the server computer 130. In one implementation, the server computer 130 may receive data from multiple marine electronics devices 110. The server computer 130 may be located remotely relative to the vessel or disposed on board the vessel. For example, the server computer 130 may be located on land.

In one implementation, the marine electronics device 110 may transmit data directly to the server computer 130 via a memory card, wired connection, Wi-Fi™ technology, cellular technology, Bluetooth™ technology, satellite technology, a LAN 276 or WAN 266 as described above, and/or any other implementation known to those skilled in the art. In such an implementation, the marine electronics device 110 may transmit the data at specified intervals, at the conclusion of a trip by a vessel, or combinations thereof. In another implementation, the marine electronics device 110 may transmit the data to the server computer 130 once a connection via Wi-Fi™ technology, cellular technology, Bluetooth™ technology, satellite technology, and/or the like has been established.

Figure 4:
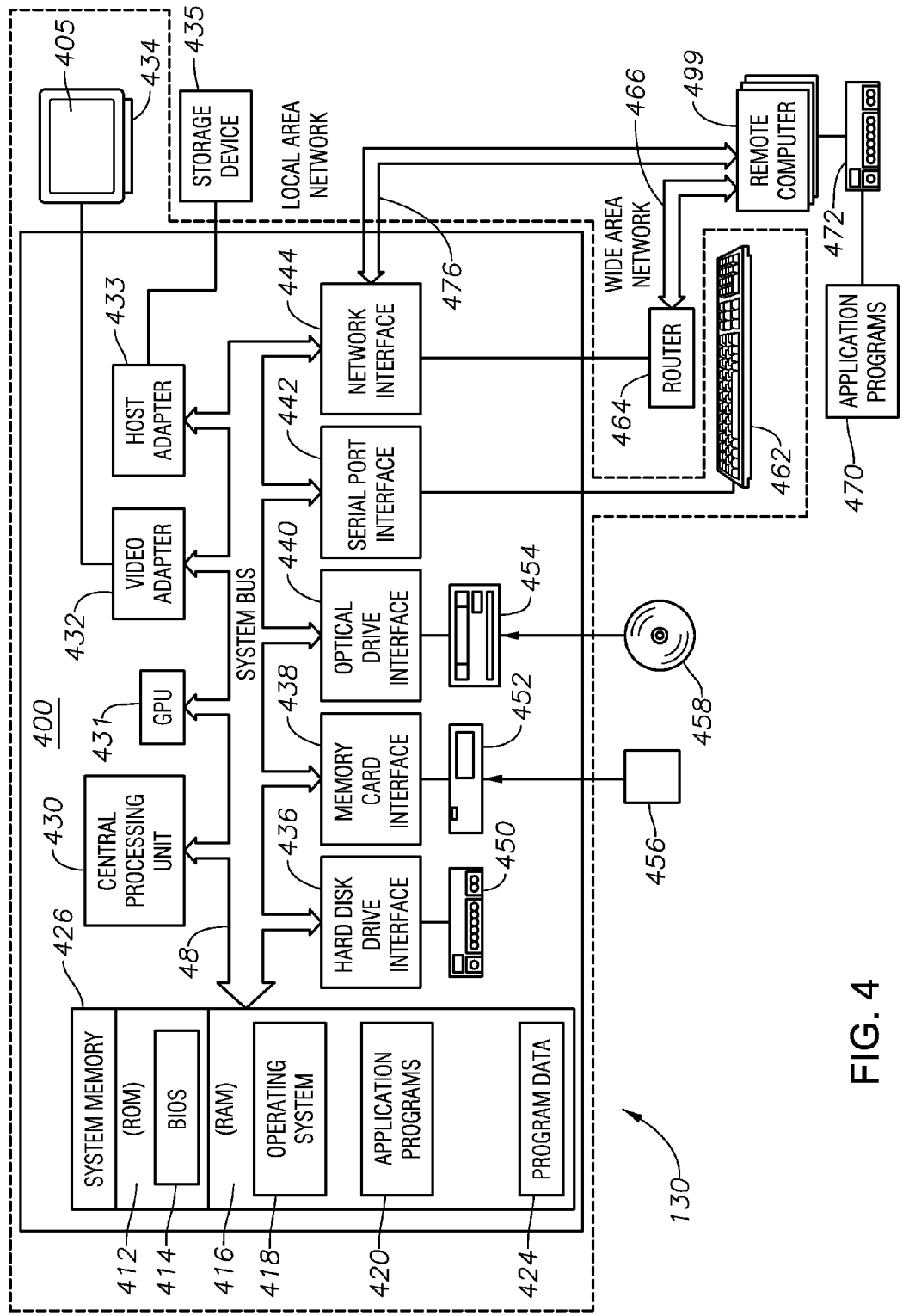
FIG. 4 illustrates a schematic diagram of a server computer having a computing system in accordance with implementations of various techniques described herein.

FIG. 4 illustrates a schematic diagram of the server computer 130 having a computing system 400 in accordance with implementations of various techniques described herein. The server computer 130 may be a conventional desktop, a handheld device, personal digital assistant, a server computer, electronic device/instrument, laptop, tablet, or any other implementation known to those skilled in the art. In one implementation, the server computer 130 may be positioned at a different geographic location than the marine electronics device 110. In another implementation, the server computer 130 may be implemented using cloud computing.

Generally, the server computer 130 and the computing system 400 include at least some components which have generally similar functionality as those described with respect to the computing system 200. In particular, the computing system 400 may include a central processing unit (CPU) 430, a system memory 426, a graphics processing unit (GPU) 431 and a system bus 428 that couples various system components including the system memory 426 to the CPU 430, and which operate similar to their respective counterparts in the computing system 200. In addition, for some implementations, a user may enter commands and information into the computing system 400 through input devices such as buttons 462. These and other input devices may be connected to the CPU 430 through a serial port interface 442 coupled to system bus 428, but may be connected by other interfaces, such as a parallel port, game port or a universal serial bus (USB).

In addition, the computing system 400 may also connect to remote computers 474 via LAN 476 or WAN 466. When using a LAN networking environment, the computing system 400 may be connected to the LAN 476 through the network interface or adapter 444. The LAN 476 may be implemented via a wired connection or a wireless connection. The LAN 476 may be implemented using Wi-Fi™ technology, cellular technology, Bluetooth™ technology, satellite technology, or any other implementation known to those skilled in the art. The network interface 444 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 474. In one implementation, the LAN 476 may be the same as the LAN 276, and the WAN 466 may be the same as the WAN 266, such that the marine electronics device 110 and the server computer 130 may connect to one another via remote computing.

In one implementation, the server computer 130 may receive external data via the LAN 476 or the WAN 466. The external data may be retrieved from the Internet or any other source. The external data may include atmospheric temperature, tidal data, weather, moon phase, sunrise, sunset, water levels, historic fishing data, and other fishing data.

Generating a Map

The marine computing system 100 may be used to generate a map of objects in a marine environment proximate to the vessel. The marine environment may include an area of water surrounding the vessel, such as one or more areas above and/or below a water surface. In one implementation, the marine computing system 100 may use the one or more radar sensors of the marine electronics system 278 to map the marine environment. In a further implementation, the radar sensors may be used to map the marine environment while the vessel traverses through water.

In particular, the map may be generated based on radar data acquired via the radar sensors. In addition, the generated map may display one or more substantially stationary objects in the marine environment. In one implementation, the substantially stationary objects may be positioned at least partly above the water surface, and may include one or more coastlines, moored objects, navigational markers, berths, structures, breakwaters, seawalls, sandbars, other vessels, or any other objects known to those skilled in the art. The map may also be generated based on heading data and position data. In a further implementation, the map may also be generated based on sonar data, AIS data, speed data, course data, tidal data, and/or the like.

Figure 5:
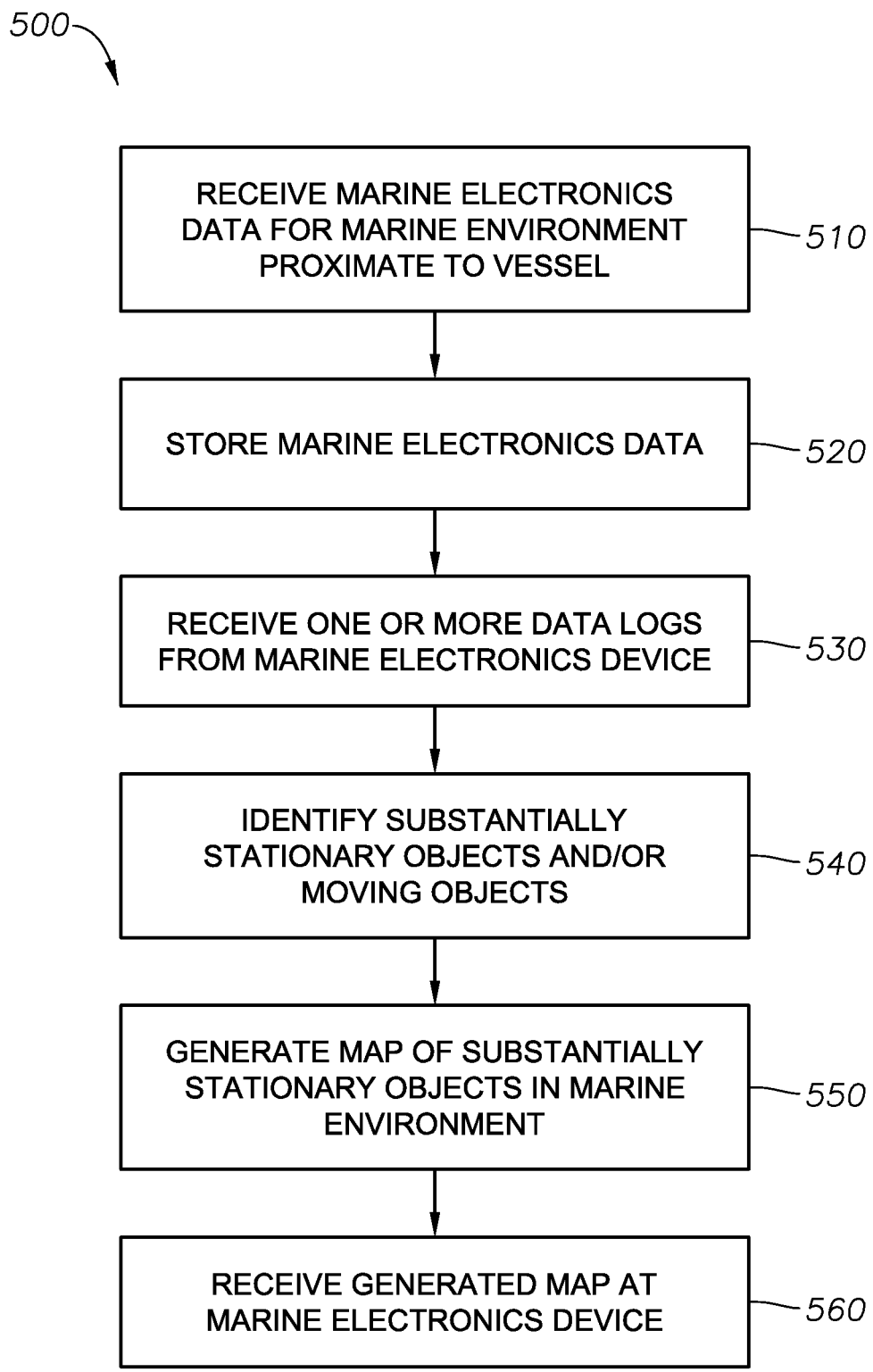
FIG. 5 illustrates a flow diagram of a method for generating a map using radar data in accordance with implementations of various techniques described herein.

FIG. 5 illustrates a flow diagram of a method 500 for generating a map using radar data in accordance with implementations of various techniques described herein. In one implementation, method 500 may be performed by one or more computer implementations, such as a marine computing system 100. As mentioned above with respect to FIG. 1, the marine computing system 100 may include a marine electronics device 110 disposed on board and/or proximate to a vessel and a server computer 130. It should be understood that while method 500 indicates a particular order of execution of operations, in some implementations, certain portions of the operations might be executed in a different order. Further, in some implementations, additional operations or steps may be added to the method 500. Likewise, some operations or steps may be omitted.

At step 510, the marine electronics device 110 may receive marine electronics data for a marine environment proximate to the vessel. As mentioned above with respect to FIG. 2, the marine electronics device 110 may receive the marine electronics data from the marine electronics system 278, where the marine electronics data may include radar data, position data, heading data, AIS data, sonar data, speed data, and/or course data. As mentioned above, the radar data may include Doppler data. In one implementation, the marine electronics device 110 may receive the marine electronics data from the marine electronics system 278 in real-time or near real-time as the data is being acquired.

In one implementation, the one or more radar sensors of the marine electronics system 278 may acquire radar data by performing a scan of (i.e., acquiring radar data for) the marine environment at specified intervals. For example, the radar sensors may include a radar antenna configured to rotate every two seconds, where the radar antenna may perform one scan of the marine environment at the end of each rotation. During each scan, the radar antenna may emit one or more radar beams into the marine environment. These radar beams may also be referred to as "transmissions" by the radar antenna. In one example, the radar antenna may perform about 2000 transmissions for each scan.

For respective transmissions of each scan, the radar sensors may receive one or more radar return signals that represent one or more objects in the marine environment. As described below with respect to step 520, the marine electronics device 110 may store these radar return signals for use in further processing.

The radar sensors may be set to continuously operate, such that the radar sensors may continuously perform scans of the marine environment as the vessel traverses on its voyage. In one example, the vessel may anchor at a particular geographical location during its voyage. In such an example, the radar sensors may continuously perform scans of the marine environment proximate to the vessel, where the marine environment may be composed of an area of water surrounding the vessel at the geographical location. In another example, the vessel may traverse along a particular route during its voyage. In such an example, the radar sensors may continuously perform scans of the changing marine environment as the vessel traverses along the route, where the marine environment is composed of multiple areas of water which surrounded the vessel along the route.

In another implementation, the radar sensors may operate in a non-continuous manner, where the radar sensors perform scans at pre-configured intervals. For example, the radar sensors may perform a scan, become idle for a period of time (e.g., 30 seconds), perform another scan, become idle again for the same period of time, and so on.

As mentioned above with respect to FIG. 2, the marine electronics system 278 may acquire the position data, heading data, AIS data, Doppler data, sonar data, speed data, and/or course data. The AIS data may include information relating to positions of other vessels and/or AIS targets in the marine environment. In addition, the Doppler data may include information relating to a radial speed of one or more other objects in the marine environment. Further, the sonar data may include information relating to depth and/or imaging of underwater features of the marine environment. The speed data and course data may relate to the speed and course, respectively, of the vessel in the marine environment. In another implementation, in a similar manner as the radar data described above, the marine electronics system 278 may acquire position data, heading data, AIS data, Doppler data, sonar data, speed data, and/or course data continuously as the vessel traverses on its voyage.

In another implementation, as mentioned above with respect to FIG. 2, the marine electronics device 110 may receive the position data from the GPS receiver system 280. In yet another implementation, and also mentioned above with respect to FIG. 2, the marine electronics device 110 may receive external data, such as tidal data, via the LAN 276, the WAN 266, the hard disk 250, the removable memory card 256, and/or any other implementation known to those skilled in the art.

At step 520, the marine electronics device 110 may store and/or record the received marine electronics data in memory in the form of one or more data logs, where the marine electronics data is grouped and/or organized within the data logs based on the data's associated transmission. In particular, for a respective transmission of the radar sensors, the marine electronics device 110 may store the transmission's corresponding radar return signals, along with the position data and the heading data of the vessel at the time the transmission was performed. In one implementation, the radar return signals, representing objects in the marine environment, may be stored in the form of polar coordinates, where the polar coordinates may represent the angular position and distance of an object from the radar antenna.

The marine electronics device 110 may also store external data, such as tidal data, and/or other marine electronics data, such as AIS data, sonar data, speed data, and/or course data. This external data and/or other marine electronics data may be associated with the transmissions and/or may include timestamps for use in future processing with the radar data. In one implementation, the marine electronics device 110 may store marine electronics data from multiple voyages of the vessel.

At step 530, the server computer 130 may receive the one or more data logs from the marine electronics device 110. As described above with respect to FIG. 4, the marine electronics device 110 may transmit the data logs directly to the server computer 130 via a memory card, wired connection, Wi-Fi™ technology, cellular technology, Bluetooth™ technology, satellite technology, and/or any other implementation known to those skilled in the art. In another implementation, and as mentioned above with respect to FIG. 4, the server computer 130 may receive external data, such as tidal data, via the LAN 476 or the WAN 466.

The server computer 130 may be configured to process the marine electronics data stored in the received data logs. This processing of the marine electronics data may be referred to as scan conversion. In one implementation, for respective transmissions, the server computer 130 may convert the polar coordinates of corresponding radar return signals into Cartesian coordinates using the transmission's associated position data and heading data. The position data and the heading data may be used to compensate for changes in the vessel's location and direction. In another implementation, the Cartesian coordinates may also be derived using Doppler data, sonar data, speed data, and/or course data.

Upon converting the polar coordinates into Cartesian coordinates, the server computer 130 may organize the Cartesian coordinates according to the scans from which they were derived. In particular, for each scan performed by the radar sensors, the server computer 130 may produce a Cartesian bitmap showing the relative locations of one or more objects located in the marine environment proximate to the vessel. Using the polar coordinates of the radar return signals, the position data, and the heading data, the server computer 130 may then georeference the objects in the Cartesian bitmap, such that the geographic locations of the objects shown in the marine environment may be determined for each scan. The server computer 130 may store the georeferenced, Cartesian bitmaps in memory, such that the bitmaps may be grouped and/or organized based on their corresponding scans.

In another implementation, the marine electronics device 110 may instead perform the scan conversion as described above. In such an implementation, the data logs transmitted by the marine electronics device 110 may include the georeferenced, Cartesian bitmaps for each scan of the marine electronics data.

At step 540, the server computer 130 may identify substantially stationary objects and/or moving objects in the marine environment based on the radar data. In particular, the server computer 130 may identify the substantially stationary objects and/or moving objects based on the georeferenced, Cartesian bitmaps derived from the radar data, position data, and heading data. In one implementation, the substantially stationary objects may be positioned at least partly above a water surface in the marine environment. As mentioned above, the substantially stationary objects may include one or more coastlines, moored objects, navigational markers, berths, structures, breakwaters, seawalls, sandbars, other vessels, or any other objects known to those skilled in the art.

In one implementation, to identify the substantially stationary objects and/or moving objects in the marine environment, the server computer 130 may analyze Cartesian bitmaps corresponding to two or more scans which were consecutively performed by the radar sensors. In analyzing the georeferenced, Cartesian bitmaps corresponding to the consecutive scans, the server computer 130 may identify objects which remained in substantially the same position during the scans and/or may identify objects which changed positions during the scans. The objects which remained in substantially the same position may be identified as the substantially stationary objects of the marine environment. The objects which changed positions may be identified as the moving objects of the marine environment. In one implementation, when comparing Cartesian bitmaps, the server computer 130 may perform an integration operation which compares relative amplitudes of the objects identified in the bitmaps or any other operation known to those skilled in the art.

In another implementation, the server computer 130 may supplement the radar data, the position data, and the heading data with other marine electronics data, such as AIS data, Doppler data, speed data, and/or course data, in order to identify the substantially stationary objects and/or moving objects. For example, the AIS data may be used to identify other vessels in the marine environment which may be anchored and thus may be temporarily stationary. Such vessels may be easily movable, and may not be considered as substantially stationary for purposes of generating the map, as discussed below. In another example, the Doppler data may be used to identify radial speeds of objects in the marine environment, which may be used to distinguish between the substantially stationary objects and the moving objects. The speed data and the course data may also be used to filter the identified radar data, as described above. In another implementation, the server computer 130 may supplement the radar data, the position data, and the heading data based on the timestamps of the other marine electronics data, where the other marine electronics data was acquired at or near the same time as the radar data, the position data, and the heading data. In yet another implementation, the server computer 130 may calculate the speed data and the course data based on the radar data, the position data, and/or the heading data.

In one implementation, moving objects may include other vessels, sea clutter, rain clutter, and/or the like. In another implementation, moving objects may include moored objects, such as moored vessels. In such an implementation, the moored objects may be identified by analyzing radar data corresponding to scans from multiple voyages by the vessel. For example, Cartesian bitmaps corresponding to scans from a single voyage by the vessel may show little to no movement by moored objects. By analyzing these Cartesian bitmaps along with Cartesian bitmaps corresponding to scans from other voyages, the server computer 130 may identify movement by the moored objects, thereby indicating that these objects are not substantially stationary. In a further implementation, the server computer 130 may identify moored objects by also analyzing Cartesian bitmaps corresponding to scans from voyages by other vessels. To compare Cartesian bitmaps from multiple voyages, the server computer 130 may initially search for bitmaps corresponding to the same or substantially the same position data, heading data, and/or geographical coordinates.

In yet another implementation, the server computer 130 may distinguish between substantially stationary objects and moving objects based on a minimum predetermined movement of the objects in the radar data and/or minimum predetermined speed of the objects. If an object in the radar data exceeds the minimum predetermined movement and/or minimum predetermined speed, then the object may be considered to be a moving object. Otherwise, the object may be considered to be a substantially stationary object. In a further implementation, substantially stationary objects may correspond to objects whose absolute speed, derived from the Doppler data, is substantially zero. Conversely, moving objects may correspond to objects whose absolute speed, derived from the Doppler data, is non-zero.

At step 550, the server computer 130 may generate a map of the substantially stationary objects in the marine environment. In one implementation, the generated map may show substantially stationary objects that are positioned at least partly above a water surface in the marine environment. For example, the generated map may display one or more coastlines of the marine environment. In another implementation, to generate the map, the server computer 130 may remove the moving objects from the radar data, such that the remaining objects of the radar data are substantially stationary. For example, to generate the map, the server computer 130 may remove the moving objects from one of the compared Cartesian bitmaps.

In another implementation, the generated map may be in the form of a chart map. In such an implementation, once the moving objects have been removed from the radar data, the server computer 130 may convert the radar data into a chart map. The generated chart map may then display the substantially stationary objects of the marine environment.

In another implementation, external data, such as tidal data, received by the server computer 130 may be integrated into the generated map. For example, a generated chart map may indicate a first set of coastlines for a high tide, and it may also indicate a second set of coastlines for a low tide. In yet another implementation, the external data may be integrated based on its timestamp, where the integrated external data was acquired at or near the same time as the radar data, the position data, and the heading data.

In yet another implementation, the server computer 130 may integrate bathymetric information for the marine environment into the generated map. In such an implementation, the server computer 130 may receive sonar data for the marine environment from the marine electronics device 110. As mentioned above, the sonar data may include information relating to depth and/or imaging of underwater features of the marine environment. The server computer 130 may derive bathymetric information based on the sonar data, and then integrate the bathymetric information with the generated map. In another implementation, for marine environments with shallow areas of water, the server computer 130 may derive the bathymetric information based on the radar data. In one implementation, bathymetric information may include information relating to a sea floor, sea terrain, and/or any other underwater features known to those skilled in the art.

At step 560, the marine electronics device 110 may receive the generated map. In one implementation, the server computer 130 may transmit the generated map to the marine electronics device 110 via a memory card, wired connection, Wi-Fi™ technology, cellular technology, Bluetooth™ technology, satellite technology, and/or any other implementation known to those skilled in the art. In another implementation, the server computer 130 may provide access to the generated map, such as through an interactive web page. The web page may be accessed via the marine electronics device 110, such that an operator of the marine electronics device 110 may select the map for downloading to the device 110.

In another implementation, all or part of method 500 may be performed by the marine electronics device 110. In such an implementation, steps 530 and 560 may be eliminated and/or considered as optional.

In sum, implementations relating to generating a map using radar data, described above with respect to FIGS. 1-5, may allow a marine computing system 100 to generate maps showing one or more substantially stationary objects of the marine environment. In particular, the generated maps may show one or more coastlines for the marine environment. Such generated maps may be used for marine environments which have not been charted, marine environments for which chart maps are unavailable, and/or marine environments for which chart maps are inaccurate.

Further, the implementations described above may reduce effects from shadowing and multi-path. In particular, shadowing may be reduced due to the additional radar data from multiple areas of water along a vessel's voyage and/or from multiple voyages. In addition, with respect to multi-path, false objects in radar data may be identified due to the use of radar data from multiple areas of water along a vessel's voyage and/or from multiple voyages.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium having stored thereon a plurality of computer-executable instructions which, when executed by a computer, cause the computer to:

receive, at a server, radar data for a marine environment from a scan performed by a radar sensor associated with a vessel, wherein the radar data is formed from one or more radar return signals received by the radar sensor during the scan, wherein the radar data indicates one or more objects in the marine environment;

process, at the server, the radar data to identify one or more moving objects by:

comparing the radar data with at least second radar data from a second scan performed by the radar sensor to determine, based on the relative position of each object between the radar data and the at least second radar data, whether the one or more objects indicated by the radar data are substantially stationary or moving;

determining, using Doppler data associated with the marine environment, if any of the one or more objects indicated by the radar data are moving based on if any of the one or more objects has a non-zero radial speed indicated by the Doppler data; or determining, using automatic identification system (AIS) data associated with the marine environment, if any of the one or more objects in the radar data are moving based on if any of the one or more objects matches a vessel identified by the AIS data;

remove, at the server, any identified moving objects from the radar data to form remaining radar data; and generate, at the server and based on the remaining radar data, a map of the marine environment for display such that one or more substantially stationary objects are present in the map and the identified moving objects are not present in the map.

2. The non-transitory computer-readable medium of claim 1, wherein the substantially stationary objects correspond to objects whose absolute speed is substantially zero, and wherein moving objects of the radar data correspond to objects whose absolute speed is non-zero.

3. The non-transitory computer-readable medium of claim 1, wherein the scan and the second scan were acquired during two or more voyages by the marine vessel.

4. The non-transitory computer-readable medium of claim 1, wherein the plurality of computer-executable instructions which, when executed by the computer, further cause the computer to:

receive position data and heading data for the marine environment; and generate the map further based on the position data and the heading data.

5. The non-transitory computer-readable medium of claim 1, wherein the plurality of computer-executable instructions which, when executed by the computer, further cause the computer to transmit the map to a marine electronics device.

6. The non-transitory computer-readable medium of claim 1, wherein the radar sensor is mounted to the marine vessel.

7. The non-transitory computer-readable medium of claim 1, wherein the radar data is represented in polar coordinates, wherein the plurality of computer-executable instructions which, when executed by the computer, further cause the computer to:

convert the radar data into Cartesian coordinates such that the one or more objects indicated by the radar data define one or more corresponding sets of Cartesian coordinates;

receive position data and heading data corresponding to the marine vessel for the marine environment at the time of the scan that produced the radar data; and determine, based on the position data, the heading data, and the sets of Cartesian coordinates, one or more geographic locations for the one or more objects indicated by the radar data.

8. The non-transitory computer-readable medium of claim 7, wherein the plurality of computer-executable instructions which, when executed by the computer, further cause the computer to process the radar data to identify one or more moving objects by comparing the radar data with the at least second radar data from the second scan by:

correlating an object indicated by the radar data with an object indicated by the at least second radar data;

determining a geographic location for the correlated object indicated by the radar data;

determining a second geographic location for the correlated object indicated by the at least second radar data; and determining that the correlated object is moving in an instance in which the second geographic location for the correlated object indicated by the at least second radar data changed at least a threshold distance from the geographic location for the correlated object indicated by the radar data.

9. The non-transitory computer-readable medium of claim 1, wherein the plurality of computer-executable instructions which, when executed by the computer, further cause the computer to display the map on a screen of a marine electronics device.

10. A method for generating a map using radar data, the method comprising:

receiving, at a server, radar data for a marine environment from a scan performed by a radar sensor associated with a marine vessel, wherein the radar data is formed from one or more radar return signals received by the radar sensor during the scan, wherein the radar data indicates one or more objects in the marine environment;

processing, at the server, the radar data to identify one or more moving objects by:

comparing the radar data with at least second radar data from a second scan performed by the radar sensor to determine, based on the relative position of each object between the radar data and the at least second radar data, whether the one or more objects indicated by the radar data are substantially stationary or moving;

determining, using Doppler data associated with the marine environment, if any of the one or more objects indicated by the radar data are moving based on if any of the one or more objects has a non-zero radial speed indicated by the Doppler data; or determining, using automatic identification system (AIS) data associated with the marine environment, if any of the one or more objects in the radar data are moving based on if any of the one or more objects matches a vessel identified by the AIS data;

removing, at the server, any identified moving objects from the radar data to form remaining radar data; and generating, at the server and based on the remaining radar data, a map of the marine environment for display such that one or more substantially stationary objects are present in the map and the identified moving objects are not present in the map.

11. The method of claim 10, wherein the radar data is represented in polar coordinates, wherein the method further comprises:

converting the radar data into Cartesian coordinates such that the one or more objects indicated by the radar data define one or more corresponding sets of Cartesian coordinates;

receiving position data and heading data corresponding to the marine vessel for the marine environment at the time of the scan that produced the radar data; and determining, based on the position data, the heading data, and the sets of Cartesian coordinates, one or more geographic locations for the one or more objects indicated by the radar data.

12. The method of claim 11, wherein processing the radar data to identify one or more moving objects comprises comparing the radar data with the at least second radar data from the second scan by:

correlating an object indicated by the radar data with an object indicated by the at least second radar data;

determining a geographic location for the correlated object indicated by the radar data;

determining a second geographic location for the correlated object indicated by the at least second radar data; and determining that the correlated object is moving in an instance in which the second geographic location for the correlated object indicated by the at least second radar data changed at least a threshold distance from the geographic location for the correlated object indicated by the radar data.

13. The method of claim 10, wherein the radar sensor is mounted to the marine vessel.

14. The method of claim 10 further comprises:

receiving position data and heading data for the marine environment; and generating the map further based on the position data and the heading data.

15. The method of claim 10 further comprises displaying the map on a screen of a marine electronics device.

16. The method of claim 10 further comprises transmitting the map to a marine electronics device.

17. A server in communication with a marine electronics device of a marine vessel, the server comprising:

a communication interface configured to receive radar data for a marine environment from a scan performed by a radar sensor associated with the marine vessel, wherein the radar data is formed from one or more radar return signals received by the radar sensor during the scan, wherein the radar data indicates one or more objects in the marine environment;
one or more processors;
a memory including a plurality of executable instructions which, when executed by the one or more processors, cause the one or more processors to:
receive the radar data;
process the radar data to identify one or more moving objects by:
comparing the radar data with at least second radar data from a second scan performed by the radar sensor to determine, based on the relative position of each object between the radar data and the at least second radar data, whether the one or more objects indicated by the radar data are substantially stationary or moving;
determining, using Doppler data associated with the marine environment, if any of the one or more objects indicated by the radar data are moving based on if any of the one or more objects has a non-zero radial speed indicated by the Doppler data; or
determining, using automatic identification system (AIS) data associated with the marine environment, if any of the one or more objects in the radar data are moving based on if any of the one or more objects matches a vessel identified by the AIS data;
remove any identified moving objects from the radar data to form remaining radar data; and
generate, based on the remaining radar data, a map of the marine environment for display such that one or more substantially stationary objects are present in the map and the identified moving objects are not present in the map.

18. The server of claim 17, wherein the radar data is represented in polar coordinates, wherein the plurality of executable instructions further cause the one or more processors to:
convert the radar data into Cartesian coordinates such that the one or more objects indicated by the radar data define one or more corresponding sets of Cartesian coordinates;
receive position data and heading data corresponding to the marine vessel for the marine environment at the time of the scan that produced the radar data; and
determine, based on the position data, the heading data, and the sets of Cartesian coordinates, one or more geographic locations for the one or more objects indicated by the radar data.

19. The server of claim 18, wherein the plurality of executable instructions further cause the one or more processors to process the radar data to identify one or more moving objects by comparing the radar data with the at least second radar data from the second scan by:
correlating an object indicated by the radar data with an object indicated by the at least second radar data;
determining a geographic location for the correlated object indicated by the radar data;
determining a second geographic location for the correlated object indicated by the at least second radar data; and
determining that the correlated object is moving in an instance in which the second geographic location for the correlated object indicated by the at least second radar data changed at least a threshold distance from the geographic location for the correlated object indicated by the radar data.

* * * * *

UNITED STATES PATENT AND TRADEMARK OFFICE
CERTIFICATE OF CORRECTION

PATENT NO. : 9,581,695 B2
APPLICATION NO. : 14/310053
DATED : February 28, 2017
INVENTOR(S) : Corbett et al.

Page 1 of 1

It is certified that error appears in the above-identified patent and that said Letters Patent is hereby corrected as shown below:

On the Title Page

Column 1:
"(72) Inventors: Andrew Corbett, Auckland (NZ);
    Shane Coloney, Jenks, OK (US);
    Lindsay Lilburn, Auckland (NZ)"

Should read:
--(72) Inventors: Andrew Corbett, Auckland (NZ);
    Leonard Shane Coloney, Jenks, OK (US);
    Lindsay Lilburn, Auckland (NZ)--

Signed and Sealed this
Third Day of October, 2017

Joseph Matal
*Performing the Functions and Duties of the
Under Secretary of Commerce for Intellectual Property and
Director of the United States Patent and Trademark Office*